(12) United States Patent
Katsumata et al.

(10) Patent No.: US 11,086,063 B2
(45) Date of Patent: *Aug. 10, 2021

(54) PLANAR LIGHT UNIT

(71) Applicants: CITIZEN WATCH CO., LTD., Tokyo (JP); CITIZEN ELECTRONICS CO., LTD., Yamanashi (JP)

(72) Inventors: Toshinobu Katsumata, Yamanashi (JP); Junji Miyashita, Yamanashi (JP)

(73) Assignee: Citizen Watch Co., Ltd., Tokyo (JP)

( * ) Notice: Subject to any disclaimer, the term of this patent is extended or adjusted under 35 U.S.C. 154(b) by 743 days.

This patent is subject to a terminal disclaimer.

(21) Appl. No.: 15/622,570

(22) Filed: Jun. 14, 2017

(65) Prior Publication Data
US 2017/0276859 A1 Sep. 28, 2017

Related U.S. Application Data

(63) Continuation of application No. 14/697,876, filed on Apr. 28, 2015, now Pat. No. 9,715,054.

(30) Foreign Application Priority Data

Sep. 24, 2014 (JP) .............................. JP2014-193430
Oct. 27, 2014 (JP) .............................. JP2014-218077

(51) Int. Cl.
*F21V 8/00* (2006.01)

(52) U.S. Cl.
CPC ......... *G02B 6/0021* (2013.01); *G02B 6/0016* (2013.01); *G02B 6/0025* (2013.01);
(Continued)

(58) Field of Classification Search
CPC . G02B 6/00; F21Y 2103/022; F21Y 2105/00; G02F 1/133615; G02F 1/133504; F21K 9/52
(Continued)

(56) References Cited

U.S. PATENT DOCUMENTS 5,984,485 A * 11/1999 Poli .................... G04B 19/30
362/23.15
6,473,554 B1 * 10/2002 Pelka .................. G02B 6/0018
385/146
(Continued)

FOREIGN PATENT DOCUMENTS

JP 2004134223 A 4/2004

OTHER PUBLICATIONS

Non Final Office Action for U.S. Appl. No. 14/697,876, dated Jun. 23, 2016, 12 pages.
(Continued)

*Primary Examiner* — William J Carter
(74) *Attorney, Agent, or Firm* — RatnerPrestia

(57) ABSTRACT

A planar light unit is provided that suppresses appearance of a bright line when viewed from the side of the emission surface of the light guide plate. The planar light unit includes a light source, and a light guide plate including an incident surface for receiving light emitted from the light source, an emission surface from which the light introduced through the incident surface is emitted, an opposing surface disposed so as to oppose the emission surface, and a side surface disposed along an outer periphery of the emission surface and the opposing surface. The emission surface has a non-rectangular outer shape, and at least a part of the side surface is formed as a diffusing surface.

22 Claims, 8 Drawing Sheets

(52) U.S. Cl.
CPC ......... *G02B 6/0031* (2013.01); *G02B 6/0043* (2013.01); *G02B 6/0068* (2013.01)

(58) Field of Classification Search
USPC .................................................. 362/459–549
See application file for complete search history.

(56) References Cited

U.S. PATENT DOCUMENTS

| | | |
|---|---|---|
| 7,025,482 B2 | 4/2006 | Yamashita et al. |
| 7,839,726 B2 * | 11/2010 | Winkler ................. G04B 19/30 368/223 |
| 2002/0131261 A1 * | 9/2002 | Inui ...................... G02B 6/0018 362/612 |

OTHER PUBLICATIONS

Final Office Action for U.S. Appl. No. 14/697,876, dated Dec. 15, 2016, 11 pages.
Notice of Allowance for U.S. Appl. No. 14/697,876, dated Mar. 22, 2017, 5 pages.
Entire patent prosecution history of U.S. Appl. No. 14/697,876, filed Apr. 28, 2015, entitled, "Planar Light Unit".

* cited by examiner

22g

22d

PRIOR ART

PLANAR LIGHT UNIT

CROSS-REFERENCES TO RELATED APPLICATION

This application is a continuation application of U.S. patent application Ser. No. 14/697,876, filed Apr. 28, 2015 which claims benefit of JP 2014-193430, filed on Sep. 24, 2014, and JP 2014-218077, filed on Oct. 27, 2014. The entire contents of U.S. patent application Ser. No. 14/697,876, JP 2014-193430 and JP 2014-218077 are hereby incorporated by reference.

TECHNICAL FIELD

The present invention relates to a planar light unit that illuminates an indicator such as a face of a watch from a rear side.

BACKGROUND

An illumination device is known that illuminates a small and circular indicator such as the face of a watch, from an upper side of the periphery of the indicator. Such an illumination device can be exemplified by a front light (illuminator) including an annular light guide that emits light from the periphery of the face toward the center thereof, so as to illuminate the face.

FIG. 10 is a perspective view of a front light disclosed in Japanese Laid Open Patent Publication No. 2004-134223. As illustrated in FIG. 10, the front light 10 includes a light guide unit 9 having a light guide 12, and a light source unit 11. The light guide 12 includes an incident surface 12a, to which the light source unit 11 is attached. An emission surface 12b from which light led into the light guide 12 is emitted is provided along the inner circumference of the light guide 12. Along the outer circumference of the light guide 12, a reflecting surface 12c is provided. The reflecting surface 12c includes reflecting grooves 14 each having a wedge-shaped cross-section, so as to reflect the light toward the emission surface 12b. With the mentioned configuration, the front light 10 uniformly illuminates the circular region inside the light guide 12.

When it is desired to display various types of information in addition to simple indications of the time of day, an LCD panel is often employed in the face. As is widely known regarding information devices, the LCD panel looks nicer when lit by a backlight (planar light unit), rather than by a front light. On the other hand, an EL panel is often employed as backlight for an LCD panel of the face of a watch that is required to be designed in a small and thin shape.

SUMMARY

The EL panel requires a voltage as high as approximately 100 V, and is not so eminent in emission chromaticity and emission efficiency. Accordingly, it is preferable to employ a backlight including an LED as light source and a thin light guide plate.

The present inventor has made up a backlight (planar light unit) including an LED and a light guide for use in a watch with an LCD panel mounted in the face, on the basis of the knowledge on the front light and the backlight device of information devices. The backlight includes a circular disk-shaped light guide plate, and the LED attached to an incident surface formed by linearly cutting away a part of the light guide plate. Light extraction dots are formed on a surface opposed to an emission surface of the light guide plate. The side surfaces of the light guide plate other than the incident surface are mirror-finished so as to direct the light that has propagated through the light guide and reached the side surface toward the center of the light guide plate. Here, the mirror-finished surface refers to a planarized surface that causes total reflection. The outer periphery of the light guide plate is surrounded by a white frame.

Upon turning on the backlight configured as above, an annular bright line was observed on the emission surface of the light guide plate. It has further proved that the bright line appears not only with the backlight including the circular disk-shaped light guide plate, but also with a backlight including a light guide plate that includes a curved portion formed around the emission surface, and a backlight including a light guide plate without the curved portion but having a non-rectangular shape.

In an aspect, the present invention provides a planar light unit that suppresses appearance of a bright line when viewed from the side of the emission surface of the light guide plate.

In another aspect, the present invention provides a planar light unit that suppresses, despite the light guide plate including a curved portion formed therearound, appearance of the bright line originating from the curved portion, when viewed from the side of the emission surface of the light guide plate.

The planar light unit includes a light source, and a light guide plate including an incident surface for receiving light emitted from the light source, an emission surface from which the light introduced through the incident surface is emitted, an opposing surface disposed so as to oppose the emission surface, and a side surface disposed along an outer periphery of the emission surface and the opposing surface, wherein the emission surface has a non-rectangular outer shape, and at least a part of the side surface is formed as a diffusing surface.

Preferably, in the planar light unit the light guide plate may have a circular disk shape with a cutaway portion, and the incident surface may be located in the cutaway portion.

Preferably, in the planar light unit the diffusing surface may be formed by an electrical discharge processing method.

Preferably, in the planar light unit the diffusing surface may be formed through a die machining process.

Preferably, in the planar light unit the diffusing surface may be a prism surface or a concave-convex surface.

Preferably, in the planar light unit the diffusing surface may be formed with the die having an inner surface subjected to an electrical discharge processing.

Preferably, in the planar light unit the incident surface may include a first incident surface and a second incident surface located beside the first incident surface, the light source may include a first light source opposed to the first incident surface and a second light source opposed to the second incident surface, the first incident surface may include a first prism having a ridgeline oriented in a thickness direction of the light guide plate, the second incident surface may include a second prism having a ridgeline oriented in a thickness direction of the light guide plate, the first prism may have an asymmetrical horizontal cross-sectional shape parallel to the emission surface, the cross-section including a first side located on the side of the side surface and a second side located on the side of the second incident surface, the second prism may have an asymmetrical horizontal cross-sectional shape parallel to the emission surface, the cross-section including a third side located on the side of the first incident surface and a fourth side located on the side of the side surface, a first average value of angles defined between a first optical axis from the first light source to the first incident surface and the first side may be larger than a second average value of angles defined between the first optical axis and the second side, and a fourth average value of angles defined between a second optical axis from the second light source to the second incident surface and the fourth side may be larger than a third average value of angles defined between the second optical axis and the third side.

Preferably, in the planar light unit the first prism and the second prism may each include, in the horizontal cross-section parallel to the emission surface, a plurality of scalene triangles each having an apex of right angle or an acute angle, and a plurality of scalene triangles each having an apex of an obtuse angle, the former scalene triangles and the latter scalene triangles being alternately aligned.

Preferably, in the planar light unit the first prism and the second prism may each include a plurality of prisms, and a planar portion formed between the prisms.

Preferably, in the planar light unit at least one of the opposing surface and the emission surface may include a projection or a recess for emitting the light introduced through the incident surface to outside through the emission surface.

Preferably, in the planar light unit the emission surface may have a non-rectangular outer shape including a curved portion.

Preferably, in the planar light unit a surface roughness of the diffusing surface formed on a portion of the side surface where the curved portion has larger curvature is higher than a surface roughness of the diffusing surface formed on a portion of the side surface where the curved portion has smaller curvature.

Preferably, in the planar light unit the emission surface may have a non-rectangular outer shape solely composed of a plurality of linear portions.

Preferably, in the planar light unit a surface roughness of the diffusing surface formed on the side surface corresponding to a portion in a vicinity of a vertex defined by the linear portions may be higher than a surface roughness of the diffusing surface formed on the side surface corresponding to a portion other than the vicinity of the vertex defined by the linear portions.

The planar light unit includes the light source and the light guide plate and is configured to introduce the light from the light source into the light guide plate through the incident surface and to emit the light through the emission surface of the light guide plate orthogonal to the incident surface, wherein the light guide plate includes the curved portion formed therearound when viewed from the side of the emission surface, and the side surface of the curved portion serves as the diffusing surface.

Thus, the planar light unit according to the present invention suppresses appearance of a bright line by utilizing at least a part of the side surface as the diffusing surface.

BRIEF DESCRIPTION OF THE DRAWING

Other features and advantages of the present planar light unit will be apparent from the ensuing description, taken in conjunction with the accompanying drawings, in which.

DESCRIPTION

Hereafter, a planar light unit will be described with reference to the drawings. It is to be understood that the technical scope of the present invention is not limited to the following embodiments but encompasses the invention defined in the appended claims and the equivalents thereof. In all the drawings, the same or corresponding elements are given the same numeral, and duplicated description may not be repeated.

Figure 1:
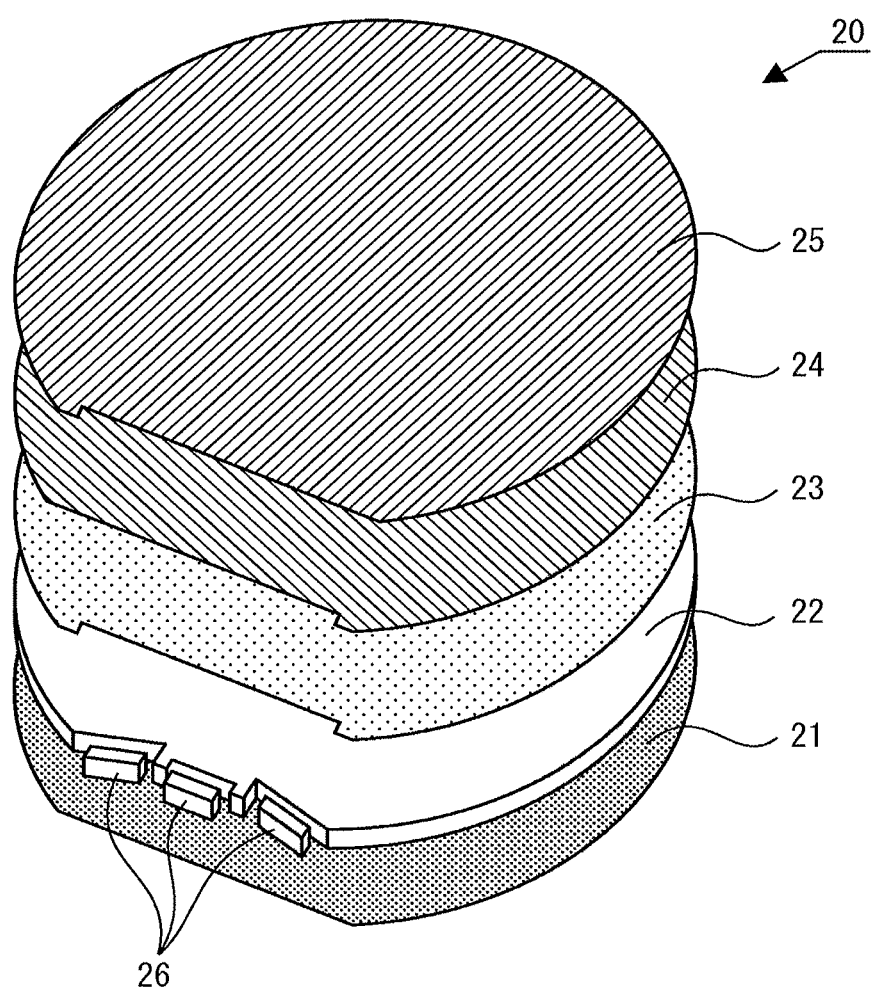
FIG. 1 is an exploded perspective view of a planar light unit 20.

FIG. 1 is an exploded perspective view of the planar light unit 20.

As illustrated in FIG. 1, the planar light unit 20 includes a reflecting sheet 21, and a light guide plate 22, a diffusing sheet 23, and prism sheets 24 and 25 stacked on the reflecting sheet 21.

The reflecting sheet 21 has a thickness of 65 μm, and reflects light that has leaked from the lower face of the light guide plate 22 toward an emission surface 22e of the light guide plate 22. The diffusing sheet 23 is formed in a thickness of 35 μm, by scattering and fixing diffusing particles on a transparent sheet, and spreads the light emitted from the light guide plate 22. The prism sheets 24 and 25 each have a thickness of 65 μm, and include microprisms for adjusting the light-emitting direction, on the upper face. The prism ridgeline of the prism sheet 24 is orthogonal to the prism ridgeline of the prism sheet 25.

Figure 2:
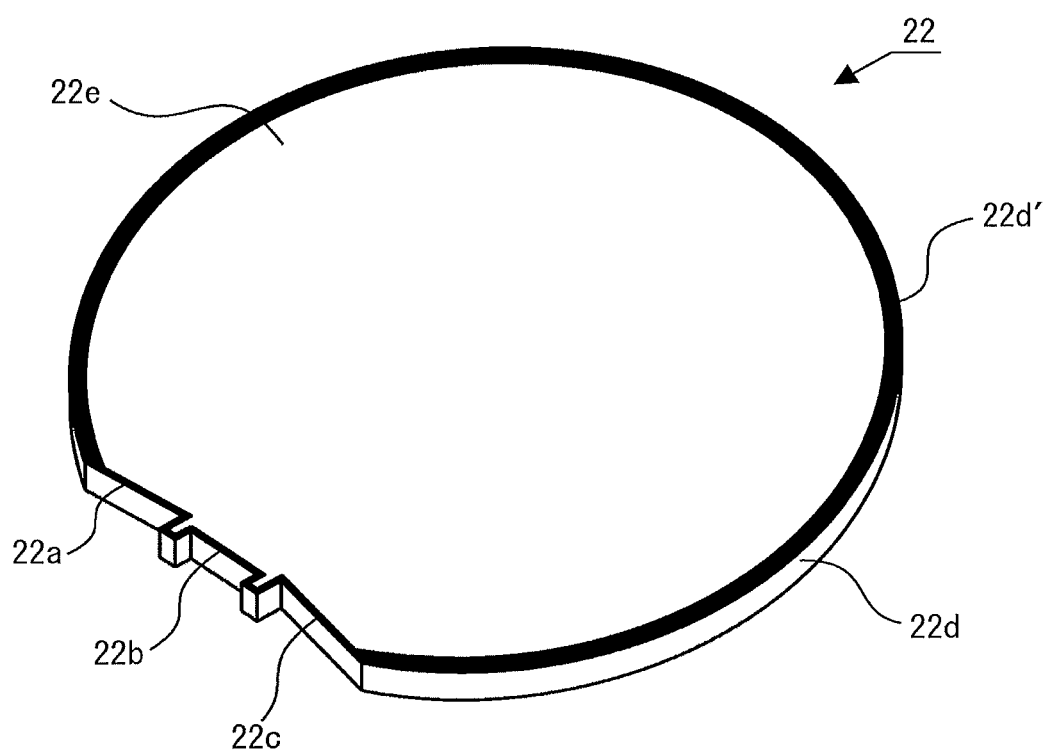
FIG. 2 is a perspective view of a light guide plate 22.
Figure 3:
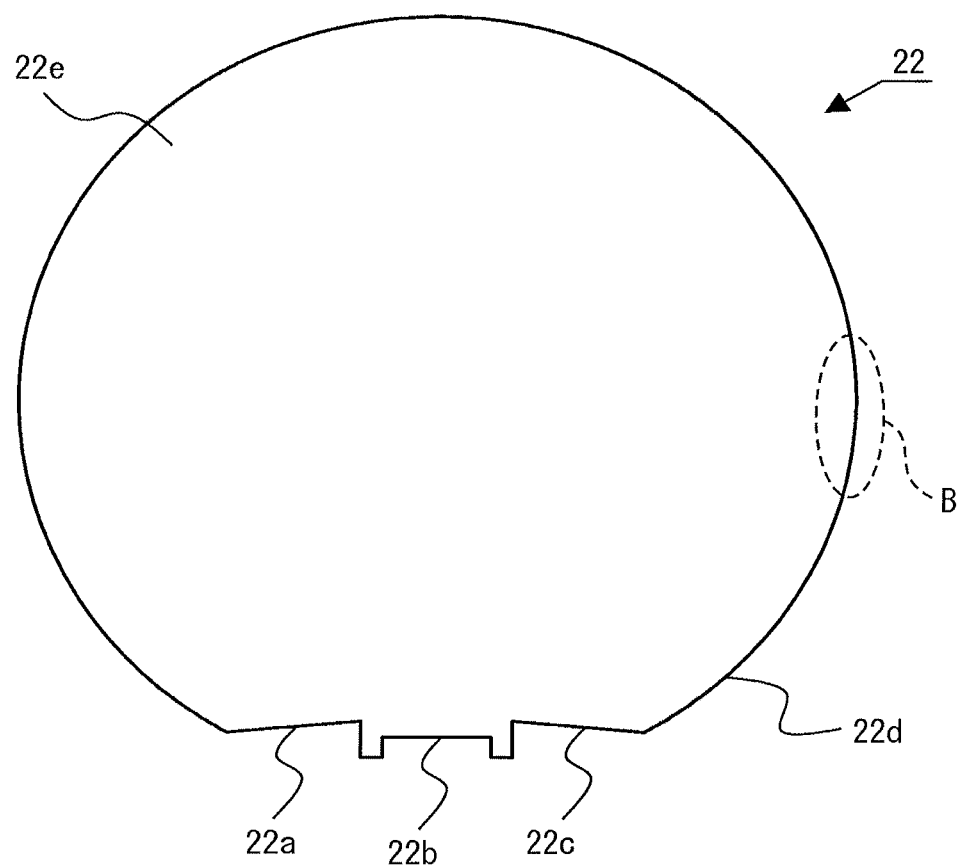
FIG. 3 is a plan view of the light guide plate 22.

FIG. 2 is a perspective view of the light guide plate 22, and FIG. 3 is a plan view of the light guide plate 22.

As illustrated in FIG. 2 and FIG. 3, the light guide plate 22 has a circular disk shape with a cutaway portion, and includes incident surfaces 22a, 22b, and 22c formed in the cutaway portion. The incident surfaces 22a, 22b, and 22c are partitioned by two projections. The incident surface 22b in the central position is formed such that the perpendicular bisector passes the center of the circular disk (light guide plate 22). The regions on the respective sides 22a and 22c are inclined with respect to the incident surface 22b located therebetween, such that the end portion on the central side is recessed more deeply. The inclination allows sufficient light distribution to the regions on the left and right of the incident surfaces 22a, 22b, and 22c.

The light guide plate 22 has a thickness of 400 μm, and includes the incident surfaces 22a, 22b, and 22c formed on the side surface and a plurality of dots (not illustrated) for emitting the introduced light through the emission surface 22e, the dots being formed on an opposing surface 22f opposed to the emission surface 22e. The light introduced through the incident surfaces 22a, 22b, and 22c is caused to change the direction by the dots formed on the opposing surface 22f of the light guide plate 22 while propagating inside the light guide plate 22, to be thereby emitted through the emission surface 22e. Here, recesses may be formed in place of the dots.

One each LED 26 is attached to the incident surfaces 22a, 22b, and 22c, i.e., totally three LEDs 26 are provided (see FIG. 1). The LEDs 26 are each mounted on a non-illustrated flexible printed circuit board (FPC), and the light-emitting surface of each LED 26 is opposed to the corresponding incident surface 22a, 22b, or 22c of the light guide plate 22. A non-illustrated light-shielding sheet is provided on the face of the FPC oriented to the light guide plate 22, to prevent the light from the LED 26 that has been colored upon entering the FPC from intruding into the light guide plate 22. The outer periphery of the light guide plate 22 is surrounded by a non-illustrated white frame. Light incident on the side surface 22d at an angle smaller than a critical angle is transmitted through the side surface 22d, irregularly reflected by the white frame surrounding the outer periphery of the light guide plate 22, and then again incident on the light guide plate 22.

In the light guide plate 22, a side surface 22d formed between the emission surface 22e and the opposing surface 22f along the curved portion, indicated by a bold line 22d' in FIG. 2 and constituting a part of the outer periphery of the emission surface 22e, serves as a diffusing surface. The dots formed on the opposing surface 22f of the light guide plate 22 are different in density or size depending on the location, so as to uniformly emit the light. Although the entirety of the side surface 22d of the light guide plate 22 except the incident surfaces is utilized as the diffusing surface in FIG. 2, only a part of the side surface 22d may be utilized as the diffusing surface.

Figure 4A:
FIG. 4A is an enlarged view of a side surface 22g of a light guide plate 22h included in a planar light unit 20h according to a comparative example.
Figure 4B:
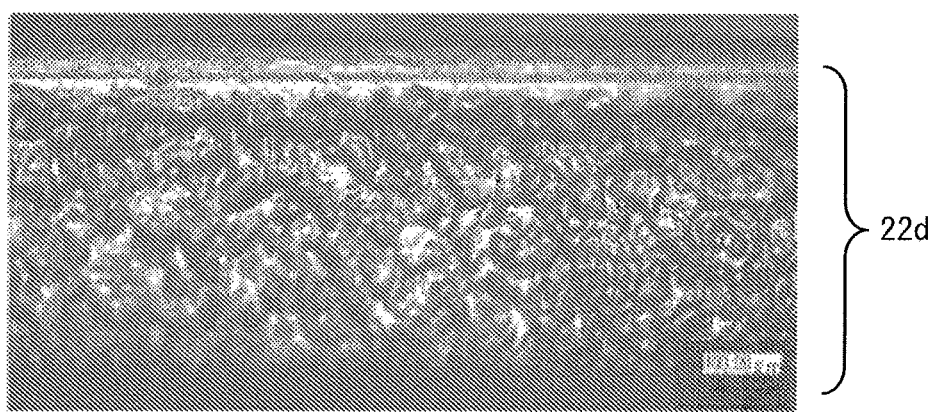
FIG. 4B is an enlarged view of a side surface 22d of the light guide plate 22.

FIG. 4A is an enlarged view of a side surface 22g of a light guide plate 22h included in a planar light unit 20h according to a comparative example, and FIG. 4B is an enlarged view of the side surface 22d of the light guide plate 22. The planar light unit 20h according to the comparative example is different from the planar light unit 20 only in the processing method of the side surface of the curved portion of the light guide plate 22h, and the configuration of the remaining portions of the planar light unit 20h is the same as that of the planar light unit 20.

As illustrated in FIG. 4A, the side surface 22g of the light guide plate 22h according to the comparative example is a planar surface. The side surface 22g is a mirror surface unprocessed after removal from the die. In contrast, the side surface 22d of the curved portion of the light guide plate 22 illustrated in FIG. 4B has been subjected to electrical discharge processing, so as to form the diffusing surface including randomly formed protrusions and recesses on the side surface 22d. The light guide plate 22h of FIG. 4A is the same as the light guide plate 22 of FIG. 4B but before the discharge processing. To form the diffusing surface of the side surface 22d, different methods may be employed as will be subsequently described with reference to FIG. 5 and FIG. 6, instead of the discharge processing. The extent of the surface roughness of the diffusing surface may be quantified by various parameters. For example, the surface roughness of the diffusing surface of the side surface 22d may be designed such that a height of a highest portion from the bottom becomes approximately 20 µm.

In the planar light unit 20h according to the comparative example, light introduced in the light guide plate 22h through the incident surfaces 22a, 22b, and 22c repeats total reflection while propagating inside the light guide plate 22h, and a part of the light reaches the side surface 22g of the curved portion. Since the side surface 22g of the curved portion of the light guide plate 22h is a mirror surface as illustrated in FIG. 4A, the light incident on the side surface 22g at an angle larger than the critical angle is totally reflected. The side surface 22g is curved, and therefore the light totally reflected by the side surface 22g concentrates in an annular shape. The light thus concentrating in the annular shape constitutes an annular bright line. In particular, the annular bright line more prominently appears in a region in the vicinity of the incident surfaces 22a and 22c where the incident angle with respect to the side surface 22g is larger, and is not clearly visible in an opposite region across the center of the light guide plate 22h (region opposing the incident surface 22b).

In contrast, when the side surface 22d of the light guide plate 22 is formed as the irregularly reflecting surface (diffusing surface) as illustrated in FIG. 4B, the light is reflected in random directions by the side surface 22d. Accordingly, the light is prevented from concentrating when reflected by the side surface 22d, and therefore the annular bright line, which appears in the light guide plate 22h of FIG. 4A, is suppressed from appearing in the light guide plate 22 having the side surface 22d subjected to the discharge processing, as illustrated in FIG. 4B.

Figure 5:
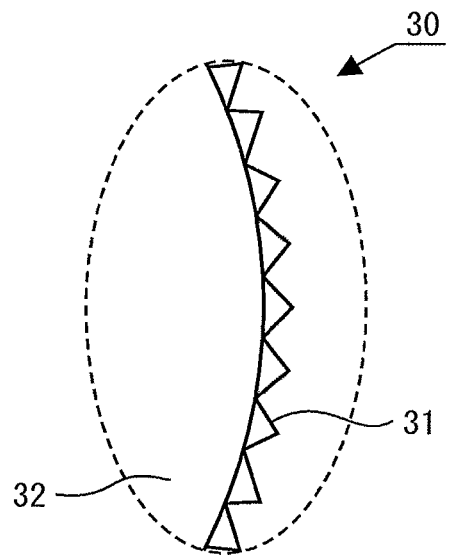
FIG. 5 is an enlarged fragmentary plan view of a curved portion of another light guide plate 32.

FIG. 5 is an enlarged fragmentary plan view of the curved portion of another light guide plate 32.

A planar light unit 30 has the same configuration as the planar light unit 20 of FIG. 1, except for the light guide plate 32. The overall shape of the light guide plate 32 is the same as that of the light guide plate 22 of FIG. 3, except for the configuration of the side surface. FIG. 5 illustrates a region of the light guide plate 32 corresponding to the region denoted by B in FIG. 3, in an enlarged scale.

As illustrated in FIG. 5, the side surface of the curved portion of the light guide plate 32 is formed as a prism surface on which a plurality of microprisms 31 are aligned. The microprisms 31 each extend in the thickness direction of the light guide plate 32, and have a triangular cross-section. A part of light that has reached the side surface of the curved portion is reflected by the microprism 31. The reflecting surface of the microprism 31 cancels the concave curved shape of the curved portion, and therefore the reflected light is not concentrated. The remaining portion of the light that has reached the side surface is transmitted through the side surface, irregularly reflected by the white frame surrounding the outer periphery of the light guide plate 32, and then again incident on the light guide plate 32.

The cross-section of the microprism 31 may be circular or rectangular, instead of triangular. The light guide plate 32 may be formed through a die machining process. When the light guide plate 32 is formed through the die machining process, the manufacturing process is shortened compared with the light guide plate 22 of FIG. 2.

Figure 6:
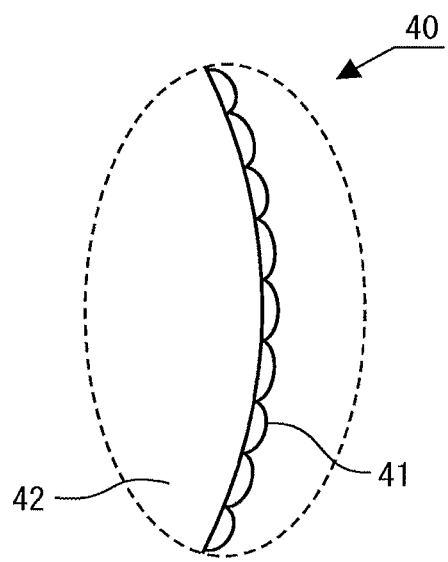
FIG. 6 is an enlarged fragmentary plan view of a curved portion of still another light guide plate 42.

FIG. 6 is an enlarged fragmentary plan view of a curved portion of still another light guide plate 42.

A planar light unit 40 has the same configuration as the planar light unit 20 of FIG. 1, except for the light guide plate 42. The overall shape of the light guide plate 42 is the same as that of the light guide plate 22 of FIG. 3, except for the configuration of the side surface. FIG. 6 illustrates a region of the light guide plate 42 corresponding to the region denoted by B in FIG. 3, in an enlarged scale.

As illustrated in FIG. 6, the side surface of the curved portion of the light guide plate 42 is formed as a concave-convex surface, on which a plurality of microdots 41 are aligned. The microdots 41 each have a dome shape, and are aligned also in the thickness direction of the light guide plate 42. A part of the light that has reached the side surface of the curved portion is reflected by the microdots 41. The reflecting surface of the microdot 41 cancels the concave curved shape of the curved portion, and therefore the reflected light is not concentrated. The remaining portion of the light that has reached the side surface is transmitted through the side surface, irregularly reflected by the white frame surrounding the outer periphery of the light guide plate 42, and then again incident on the light guide plate 42.

The light guide plate 42 may be formed through a die machining process. When the light guide plate 42 is formed through the die machining process, it is preferable to incline the side surface by approximately 5 degrees, so as to facilitate the light guide plate 42 to be removed from the die. In this case, the microdots 41 are prevented from being caught by the die when the light guide plate 42 is removed from the die. When the light guide plate 42 is formed through the die machining process, the manufacturing process is shortened compared with the light guide plate 22 of FIG. 2, as in the case of the light guide plate 32 of FIG. 5.

In the planar light unit 40 of FIG. 6, the dome-shaped microdots 41 are formed on the side surface of the light guide plate 42, to utilize the microdots as the diffusing surface. However, the concave-convex shape to be formed on the side surface of the curved portion of the light guide plate 42 is not limited to the dome shape but may be a randomly protruding and recessed shape as the side surface 22d of the curved portion of the light guide plate 22 in the planar light unit 20 of FIG. 1. To form the light guide plate having the randomly protruding and recessed side surface through the die machining, it is preferable to roughen the inner surface of the die (portion corresponding to the side surface of the curved portion) by discharge processing.

Figure 7A:
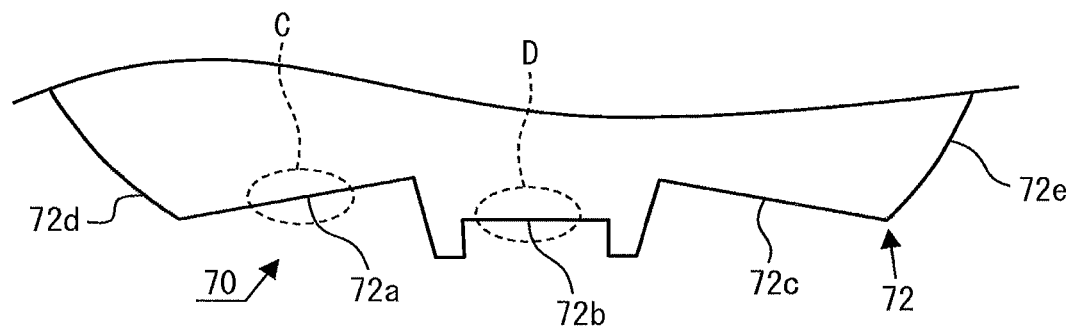
FIG. 7A is a plan view of a portion in the vicinity of incident surfaces 72a, 72b, and 72c, in still another light guide plate 72.

FIG. 7A is a plan view of a portion in the vicinity of incident surfaces 72a, 72b, and 72c, in still another light guide plate 72.

The planar light unit 70 has the same configuration as the planar light unit 20 of FIG. 1, except for the light guide plate 72. The overall shape of the light guide plate 72 is the same as that of the light guide plate 22 of FIG. 3, except for the configuration of the incident surface. FIG. 7A illustrates incident surfaces 72a, 72b, and 72c of the light guide plate 72 corresponding to the incident surfaces 22a, 22b, and 22c of the light guide plate 22 of FIG. 3, in an enlarged scale.

The light guide plate 72 includes the incident surfaces 72a, 72b, and 72c, and side surfaces 72d and 72e. In FIG. 7A, the side surface is separately indicated as a side surface 72d and a side surface 72e, for the sake of clarity of description. Though not illustrated, one each LED (light source) is provided for the incident surfaces 72a, 72b, and 72c, with the light-emitting surface opposed thereto. The incident surface 72a is opposed to the LED (light source) closest to the side surface 72d. The incident surface 72c is opposed to the LED (light source) closest to the side surface 72e. The incident surfaces 72a, 72b, and 72c are adjacent to each other in the horizontal direction.

Figure 7B:
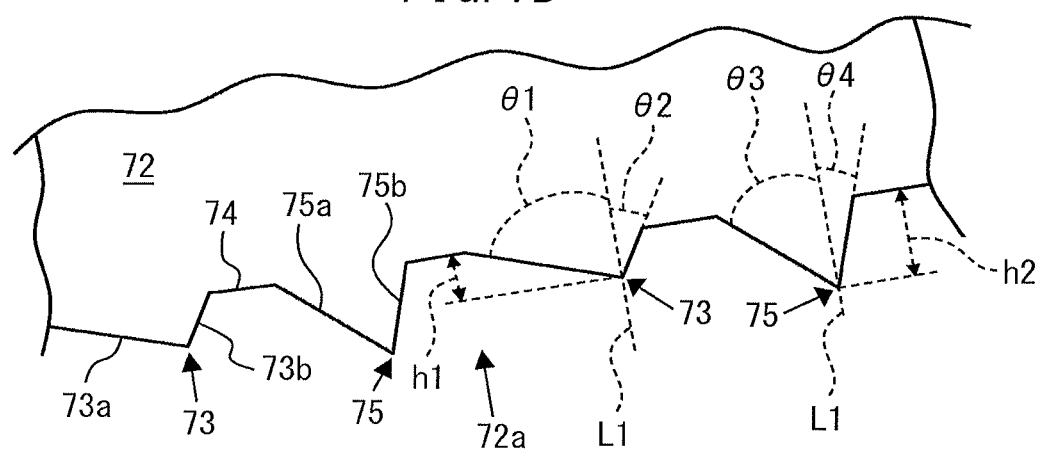
FIG. 7B is an enlarged plan view of a portion denoted by C in FIG. 7A.

FIG. 7B is an enlarged plan view of a portion denoted by C in FIG. 7A.

The incident surface 72a includes a plurality of prisms 73 and 75 each having a ridgeline oriented in the thickness direction of the light guide plate 72. The prisms 73 each have a horizontal cross-section of a scalene triangle shape with the apex of an obtuse angle. An angle θ2 defined between a side 73b of the prism 73 located on the side of the incident surface 72c of the light guide plate 72 and the optical axis L1 of the LED is smaller than an angle θ1 defined between a side 73a of the prism 73 located on the side of the side surface 72d of the light guide plate 72 and the optical axis L1 of the LED. The optical axis L1 of the LED will be assumed to be parallel to the normal of the light-emitting surface of the LED, and also parallel to the normal of the incident surface 72a (the same applies hereinafter). Since the prism 73 is a triangular column, the plan-view shape and the horizontal cross-section are of the same shape (the same applies hereinafter). The horizontal cross-section herein referred to a cross-section parallel to the emission surface of the light guide plate 72 (the same applies hereinafter).

The prisms 75 each have a horizontal cross-section of a scalene triangle shape with the apex of an acute angle or the right angle. An angle θ4 defined between a side 75b of the prism 75 located on the side of the incident surface 72c of the light guide plate 72 and the optical axis L1 of the LED is smaller than an angle θ3 defined between a side 75a of the prism 75 located on the side of the side surface 72d of the light guide plate 72 and the optical axis L1 of the LED. The height h2 of the prism 75 is higher than the height h1 of the prism 73, and a planar portion 74 is provided between the prism 75 and the prism 73. The prisms 75 and the prisms 73 are alternately aligned.

For example, the angles θ1, θ2, θ3, and θ4 are 75°, 65°, 50°, and 40°, respectively, the heights h1 and h2 are 0.005 mm and 0.010 mm respectively, and the pitch between the prisms 73 and the pitch between the prisms 75 are 0.060 mm.

Figure 7C:
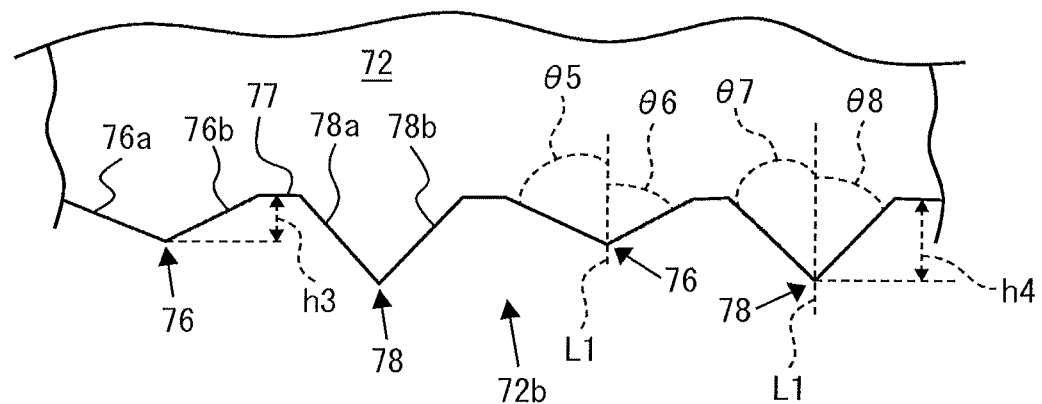
FIG. 7C is an enlarged plan view of a portion denoted by D in FIG. 7A.

FIG. 7C is an enlarged plan view of a portion denoted by D in FIG. 7A.

The incident surface 72b includes a plurality of prisms 76 and 78 each having a ridgeline oriented in the thickness direction of the light guide plate 72. The prisms 76 each have a horizontal cross-section of an isosceles triangle shape with the apex of an obtuse angle. An angle θ6 defined between a side 76b of the prism 76 and the optical axis L1 of the LED is equal to an angle θ5 defined between a side 76a of the prism 76 and the optical axis L1 of the LED. Likewise, the prisms 78 each have a horizontal cross-section of an isosceles triangle shape with the apex of an acute angle. An angle θ8 defined between a side 78b of the prism 78 and the optical axis L1 of the LED is equal to an angle θ7 defined between a side 78a of the prism 78 and the optical axis L1 of the LED. The height h4 of the prism 78 is higher than the height h3 of the prism 76, and a planar portion 77 is provided between the prism 78 and the prism 76. The prisms 78 and the prisms 76 are alternately aligned.

For example, the angles θ5, θ6, θ7, and θ8 are 70°, 70°, 45°, and 45°, respectively, and the heights h3 and h4 are 0.005 mm and 0.010 mm respectively, and the pitch between the prisms 76 and the pitch between the prisms 78 are 0.060 mm.

The incident surface 72c includes a prism row axially symmetrical with respect to a prism row formed on the incident surface 72a about a non-illustrated straight line passing the center of the incident surface 72b and the center of the light guide plate 72 as the axis. Since the incident surface 72c is axially symmetrical with respect to the incident surface 72a, the description of the incident surface 72c will be omitted.

Referring to FIG. 7C, the distribution of light that enters the light guide plate 72 through the incident surface 72b will be described. The light (light beam) emitted from the LED opposed to the incident surface 72b and incident on the side 76b of the prism 76 is refracted to the left in FIG. 7C. In contrast, the light (light beam) emitted from the LED opposed to the incident surface 72b and incident on the side 76a of the prism 76 is refracted to the right in FIG. 7C. This also applies to the prism 78, however the refraction angle is larger than the case of the prism 76. Thus, the distribution of the light that is emitted from the LED opposed to the incident surface 72b and enters the light guide plate 72 through the incident surface 72b is symmetrically spread in the horizontal direction. The presence of the planar portion 77 between the prism 78 and the prism 76, as well as the alternate alignment of the prisms 78 and the prisms 76 serves to cause the three types of light distributions to overlap, thereby contributing to improving the uniformity of the luminance distribution on the emission surface.

Referring to FIG. 7B, the distribution of light that enters the light guide plate 72 through the incident surface 72a will be described. The light (light beam) emitted from the LED opposed to the incident surface 72a and incident on the side 73b of the prism 73 is refracted to the left in FIG. 7B. In contrast, the light (light beam) emitted from the LED opposed to the incident surface 72a and incident on the side 73a of the prism 73 is refracted to the right in FIG. 7B. A difference between the prism 73 and the prism 76 of FIG. 7C at this point is that the light (light beam) incident on the side 73b of the prism 73 is more largely refracted to the side of the incident surface 72a than the light (light beam) incident on the side 73a. Therefore, the amount of the light (light beam) that proceeds to the vicinity of the boundary between the incident surface 72a and the side surface 72d is increased.

Likewise, the light emitted from the LED opposed to the incident surface 72a and incident on the side 75b of the prism 75 is refracted to the left in FIG. 7B. In contrast, the light emitted from the LED opposed to the incident surface 72a and incident on the side 75a of the prism 75 is refracted to the right in FIG. 7B. A difference between the prism 75 and the prism 78 of FIG. 7C at this point is that the light (light beam) incident on the side 75b of the prism 75 is more largely refracted to the side of the incident surface 72a than the light (light beam) incident on the side 75a. Therefore, the amount of the light (light beam) that proceeds to the vicinity of the boundary between the incident surface 72a and the side surface 72d is increased.

As result, the prisms 73 and 75 formed on the incident surface 72a contribute to increasing the luminance in the vicinity of the boundary between the incident surface 72a and the side surface 72d. The effect of increasing the luminance is similarly obtained in the vicinity of the side surface 72d, and gradually declines in a direction away from the incident surface 72a.

When the light guide plate is rectangular the incident surface is orthogonal to the side surface, and therefore the LED serving as the light source can be located closer to the side surface. Accordingly, when the light guide plate is rectangular, appearance of a dark portion is suppressed in the vicinity of the side surface orthogonal to the incident surface. When the light guide plate 72 is circular, however, the spacing between the side surfaces 72d and 72e gradually increases in a direction away from the incident surfaces 72a to 72c. Therefore, when the light guide plate is circular, a portion with insufficient light amount (dark portion) may appear in a region including the vicinity of the boundary between the incident surface 72a and the side surface 72d, and the widened portion of the side surface 72d, even if the prisms 76 and 78 of FIG. 7C are provided on the incident surface 72a. For such reasons, in the planar light unit 70 the prisms 73 and 75 on the incident surface 72a of the light guide plate 72 are formed in the scalene triangle shape, so as to secure the light distribution on the region including the vicinity of the boundary between the incident surface 72a and the side surface 72d, and the widened portion of the side surface 72d.

In the planar light unit 70, forming the incident surface 72a in an inclined shape allows the cutaway portion to be formed in a smaller size when forming the incident surface by cutting away a part of the circular light guide plate. Accordingly, it may be construed that the prisms 73 and 75 serve to assist or enhance the mentioned effect. Since the prisms 73 and 75 are regularly aligned on the incident surface 72a of the planar light unit 70, the alignment direction of the prisms 73 and 75 is barely affected by a positional shift of the LED. The prisms 73 and 75 formed on the incident surface 72a serve to alleviate the designing load of the dots to be formed on the surface opposed to the emission surface of the light guide plate 72, and also contribute to reducing the width of the frame.

In the planar light unit 70, prisms 73, 75, and so on formed on the incident surfaces 72a and 72c are triangular columns each having a horizontal cross-section of a scalene triangle shape. However, the prism for increasing the light distribution to the curved side surface of the light guide plate may be formed in other shapes than the triangular column. For example, the prism may be formed in a rectangular column having a trapezoidal horizontal cross-section with the left and right sides of different lengths, or a column shape having an asymmetrically curved horizontal cross-section. In this case, it is preferable that the prism has an asymmetrical shape along the horizontal cross-section, and an average value of angles defined in the horizontal cross-section between the side of the prism opposed to the side surface of the light guide plate and the optical axis of the light source is smaller than an average value of angles defined between the side of the prism on the side of the side surface of the light guide plate and the optical axis of the light source.

Figure 8:
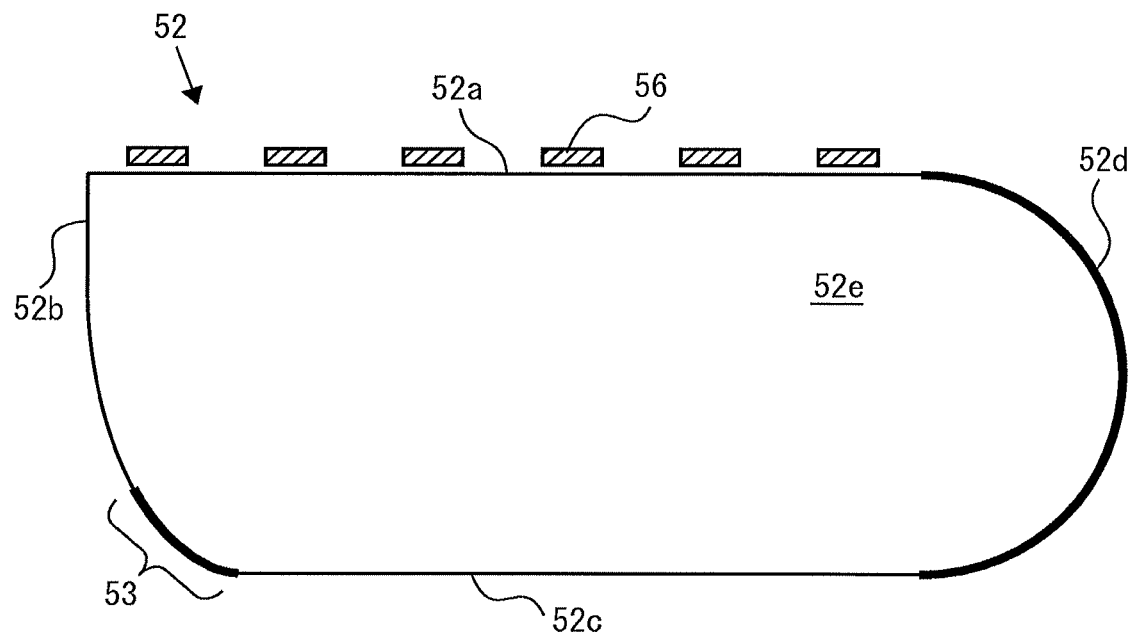
FIG. 8 is a schematic drawing for explaining another planar light unit 50.

FIG. 8 is a plan view illustrating still another light guide plate 52 and LEDs 56.

A planar light unit 50 including the light guide plate 52 and the LEDs 56 illustrated in FIG. 8 has the same configuration as the planar light unit 20 of FIG. 1 except for the shape of a reflecting sheet 51, the light guide plate 52, a diffusing sheet 53 and prism sheets 54 and 55, and the number and position of the LEDs 56. The shape of the reflecting sheet 51, the diffusing sheet 53, and the prism sheets 54 and 55 are the same as the shape of the light guide plate 52 described hereunder, and therefore the description of the mentioned sheets will be omitted.

As illustrated in FIG. 8, an emission surface 52e of the light guide plate 52 has a non-rectangular outer shape including a curved portion. To be more detailed, the outer shape of the emission surface 52e of the light guide plate 52 is composed of a linear incident surface 52a, a curved side surface 52b, a linear side surface 52c, and a curved side surface 52d. Eight LEDs 56 are disposed so as to oppose the incident surface 52a. The side surface 52b extends generally perpendicularly from the incident surface 52a, with a curvature gradually increasing in a direction away from the incident surface 52a. The side surface 52d is curved as a whole in a predetermined curvature. A portion indicated by a bold line 53 in FIG. 8 is a part of the curved side surface 52*b*.

The side surfaces 52*b*, 52*c*, and 52*d* are subjected to the discharge processing so as to form the diffusing surface thereon, and therefore appearance of the bright line is suppressed. However, the surface roughness of the diffusing surface formed on portions of the side surface where the curved portion has a larger curvature, indicated by bold lines 52*d* and 53 in FIG. 8, may be made higher than the surface roughness of a portion of the side surface where the curved portion has a smaller curvature indicated by a fine line 52*c* in FIG. 8. Such a configuration allows the appearance of the bright line to be more efficiently suppressed. The linear side surface 52*c* may be finished as a mirror surface instead of forming the diffusing surface.

The outer shape of the emission surface of the light guide plate is not limited to the foregoing examples but may be formed in a desired non-rectangular shape including a curved portion. The position to form the diffusing surface and the extent of the surface roughness of the diffusing surface may be designed as desired, in accordance with the outer shape of the emission surface of the light guide plate. The diffusing surface may be formed, without limitation to the discharge processing, by the methods described with reference to FIG. 5 and FIG. 6, or by any desired method.

Figure 9:
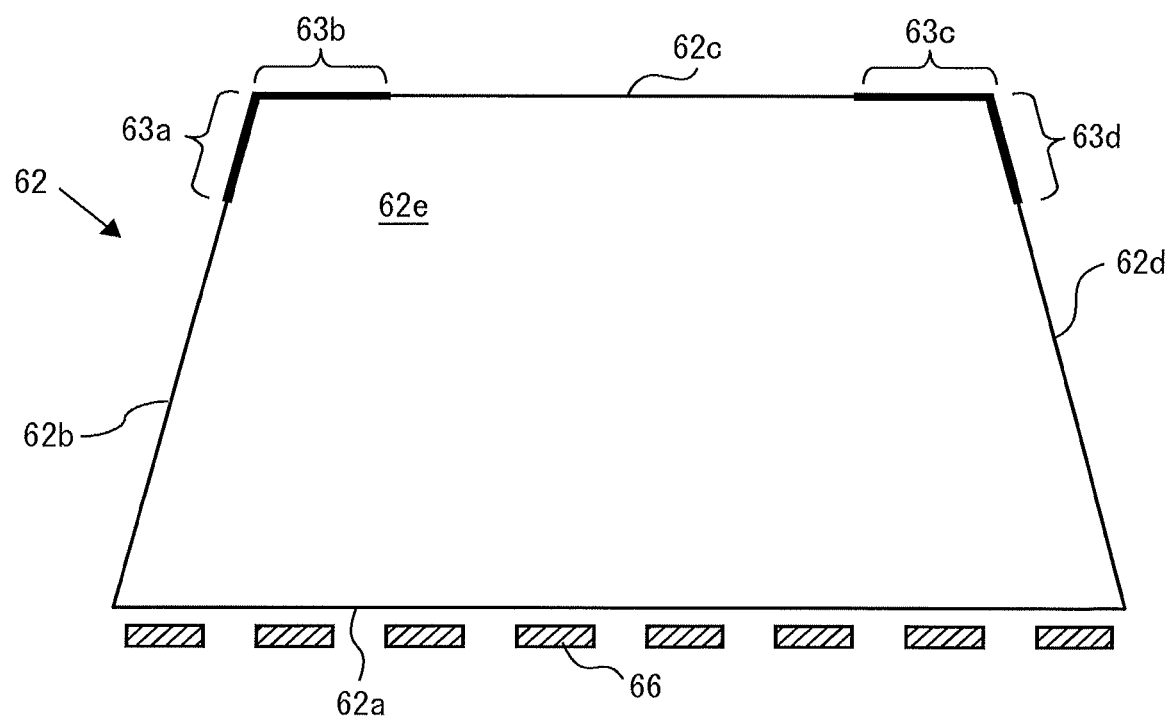
FIG. 9 is a schematic drawing for explaining still another planar light unit 60.
Figure 10:
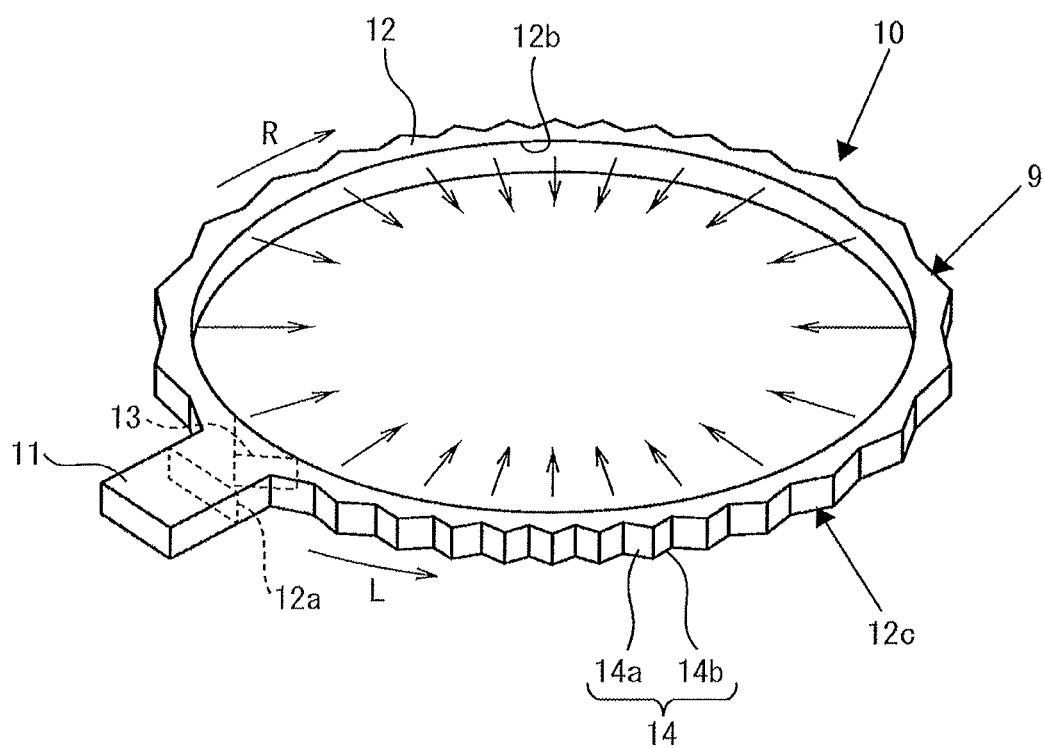
FIG. 10 is a perspective view of a front light disclosed in Japanese Laid Open Patent Publication No. 2004-134223.

FIG. 9 is a plan view illustrating still another planar light unit 62 and LEDs 66.

A planar light unit 60 including the light guide plate 62 and the LEDs 66 illustrated in FIG. 9 has the same configuration as the planar light unit 20 of FIG. 1 except for the shape of a reflecting sheet 61, the light guide plate 62, a diffusing sheet 63 and prism sheets 64 and 65, and the number and position of the LEDs 66. The shape of the reflecting sheet 61, the diffusing sheet 63, and the prism sheets 64 and 65 are the same as the shape of the light guide plate 62 described hereunder, and therefore the description of the mentioned sheets will be omitted.

As illustrated in FIG. 9, an emission surface 62*e* of the light guide plate 62 has a non-rectangular outer shape solely composed of a plurality of linear portions. To be more detailed, the emission surface 62*e* of the light guide plate 62 has a trapezoidal outer shape in which a linear incident surface 62*a* corresponds to the lower base, a linear side surface 62*c* corresponds to the upper base, and linear side surfaces 62*b* and 62*d* respectively correspond to the lateral sides. Eight LEDs 66 are disposed so as to oppose the incident surface 62*a*. A portion indicated by a bold line 63*a* in FIG. 9 is a part of the linear side surface 62*b*, portions indicated by bold lines 63*b* and 63*c* are a part of the linear side surface 62*c*, and a portion indicated by a bold line 63*d* is a part of the linear side surface 62*d*.

The incident surface 62*a* and the side surfaces 62*b*, 62*c*, and 62*d* are subjected to the discharge processing so as to form the diffusing surface thereon, and therefore the appearance of the bright line is suppressed. However, the surface roughness of the diffusing surface formed on portions of the side surfaces in the vicinity of a vertex defined between the linear portions, indicated by bold lines 63*a*, 63*b*, 63*c*, and 63*d* in FIG. 9, may be made higher than the surface roughness of a portion of the side surfaces other than the vicinity of the vertex defined between the linear portions. Such a configuration allows the appearance of the bright line to be more efficiently suppressed.

The outer shape of the emission surface of the light guide plate is not limited to the foregoing examples but may be formed in a desired non-rectangular shape solely composed of a plurality of linear portions, such as a triangle or a pentagon. The position to form the diffusing surface and the extent of the surface roughness of the diffusing surface may be designed as desired, in accordance with the outer shape of the emission surface of the light guide plate. The diffusing surface may be formed, without limitation to the discharge processing, by the methods described with reference to FIG. 5 and FIG. 6, or by any desired method.

The preceding description has been presented only to illustrate and describe exemplary embodiments of the present planar light unit. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but the invention will include all embodiments falling within the scope of the claims. The invention may be practiced otherwise than is specifically explained and illustrated without departing from its spirit or scope.

What is claimed is:

1. A light guide plate for a backlight unit comprising:
   an incident surface for receiving light emitted from a light source;
   an emission surface from which the light introduced through the incident surface is emitted;
   an opposing surface disposed so as to oppose the emission surface; and
   a side surface disposed along an outer periphery of the emission surface and the opposing surface,
   wherein the incident surface is formed on the side surface,
   the emission surface includes a planar central portion and a non-rectangular outer shape, and
   at least a part of the side surface except for the incident surface is formed as a diffusing surface.

2. The light guide plate according to claim 1, wherein the emission surface has a circular disk shape with a cutaway portion, and the incident surface is located in the cutaway portion.

3. The light guide plate according to claim 1, wherein the diffusing surface is formed by an electrical discharge processing method.

4. The light guide plate according to claim 3, wherein the diffusing surface is formed with a die having an inner surface subjected to an electrical discharge processing.

5. The light guide plate according to claim 1, wherein the diffusing surface is a prism surface or a concave-convex surface.

6. The light guide plate according to claim 1, wherein at least one of the opposing surface and the emission surface includes a projection or a recess for emitting the light introduced through the incident surface to outside through the emission surface.

7. The light guide plate according to claim 1, wherein the emission surface has a non-rectangular outer shape including a curved portion.

8. The light guide plate according to claim 7, wherein a surface roughness of the diffusing surface formed on a portion of the side surface where the curved portion has larger curvature is higher than a surface roughness of the diffusing surface formed on a portion of the side surface where the curved portion has smaller curvature.

9. The light guide plate according to claim 1, wherein the emission surface has a non-rectangular outer shape solely composed of a plurality of linear portions.

10. The light guide plate according to claim 9, wherein a surface roughness of the diffusing surface formed on the side surface corresponding to a portion in a vicinity of a vertex defined by the linear portions is higher than a surface roughness of the diffusing surface formed on the side surface corresponding to a portion other than the vicinity of the vertex defined by the linear portions.

11. The planar light guide according to claim 1, wherein the emission surface has a non-rectangular outer shape comprising at least one curved portion and at least one linear portion.

12. The planar light guide plate according to claim 1, wherein the central portion of the emission surface comprises a continuous, planar surface.

13. The planar light guide plate according to claim 1, wherein the emission surface is an outer surface of the light guide plate.

14. The planar light guide plate according to claim 1, wherein the light guide plate is devoid of an inner surface.

15. A backlight unit comprising:
a light source;
a planar light guide plate according to claim 1;
a reflecting sheet disposed adjacent the opposing surface of the light guide plate;
a diffusing sheet disposed adjacent the emission surface of the light guide plate, and
at least one prism sheet disposed adjacent the diffusing sheet.

16. The backlight unit according to claim 15, wherein the at least one prism sheet comprises two prism sheets, wherein a prism ridgeline of one prism sheet is orthogonal to a prism ridgeline of the other prism sheet.

17. The backlight unit according to claim 15, wherein the light guide plate has a circular disk shape.

18. The backlight unit according to claim 15, wherein at least one of the opposing surface and the emission surface of the light guide plate includes a projection or a recess for emitting the light introduced through the incident surface to outside through the emission surface.

19. The backlight unit according to claim 15, wherein the outer portion of the emission surface has a non-rectangular outer shape including a curved portion.

20. The backlight unit according to claim 19, wherein a surface roughness of the diffusing surface formed on a portion of the side surface where the curved portion has larger curvature is higher than a surface roughness of the diffusing surface formed on a portion of the side surface where the curved portion has smaller curvature.

21. The backlight unit according to claim 15, wherein the outer portion of the emission surface has a non-rectangular outer shape solely composed of a plurality of linear portions.

22. The backlight unit according to claim 21, wherein a surface roughness of the diffusing surface formed on the side surface corresponding to a portion in a vicinity of a vertex defined by the linear portions is higher than a surface roughness of the diffusing surface formed on the side surface corresponding to a portion other than the vicinity of the vertex defined by the linear portions.

* * * * *

UNITED STATES PATENT AND TRADEMARK OFFICE
CERTIFICATE OF CORRECTION

PATENT NO. : 11,086,063 B2
APPLICATION NO. : 15/622570
DATED : August 10, 2021
INVENTOR(S) : Toshinobu Katsumata and Junji Miyashita It is certified that error appears in the above-identified patent and that said Letters Patent is hereby corrected as shown below:

On the Title Page

Item (73) "Assignee: Citizen Watch Co. Ltd., Tokyo, (JP)" should read -- "Assignees: Citizen Watch Co., Ltd., Tokyo (JP) and Citizen Electronics Co., Ltd., Yamanashi (JP)" --.

Signed and Sealed this
Ninth Day of August, 2022

Katherine Kelly Vidal
*Director of the United States Patent and Trademark Office*